US012328003B2

(12) United States Patent
Dong et al.

(10) Patent No.: US 12,328,003 B2
(45) Date of Patent: Jun. 10, 2025

(54) ENERGY STORAGE SYSTEM, POWER CONVERSION SYSTEM, AND METHOD FOR OPTIMIZING PRIMARY FREQUENCY MODULATION

(71) Applicant: HUAWEI DIGITAL POWER TECHNOLOGIES CO., LTD., Shenzhen (CN)

(72) Inventors: Mingxuan Dong, Shanghai (CN); Kai Xin, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/519,923

(22) Filed: Nov. 27, 2023

(65) Prior Publication Data
US 2024/0106238 A1    Mar. 28, 2024

Related U.S. Application Data

(63) Continuation of application No. PCT/CN2021/096865, filed on May 28, 2021.

(51) Int. Cl.
*H02J 3/24* (2006.01)
*H02J 3/32* (2006.01)
(Continued)

(52) U.S. Cl.
CPC ............... *H02J 3/32* (2013.01); *H02J 3/241* (2020.01); *H02J 3/34* (2013.01); *H02J 7/00041* (2020.01); *H02J 7/0048* (2020.01)

(58) Field of Classification Search
CPC ...... H02J 3/32; H02J 3/241; H02J 3/34; H02J 7/00041; H02J 7/0048; H02J 3/48;
(Continued)

(56) References Cited

U.S. PATENT DOCUMENTS

2016/0268802 A1    9/2016 Shim

FOREIGN PATENT DOCUMENTS

| CN | 102326315 A | | 1/2012 |
|---|---|---|---|
| CN | 102891495 | * | 1/2013 |

(Continued)

OTHER PUBLICATIONS

International Search Report and Written Opinion in International Appln. No. PCT/CN2021/096865, mailed on Feb. 17, 2022, 15 pages (with English translation).

(Continued)

*Primary Examiner* — Elim Ortiz
*Assistant Examiner* — Xuan Ly
(74) *Attorney, Agent, or Firm* — Fish & Richardson P.C.

(57) ABSTRACT

This application discloses examples of an energy storage system, a power conversion system, and a method for optimizing primary frequency modulation. In one example, when the power conversion system determines that a state of charge (SoC) value of a target energy storage battery does not meet a target SoC value and determines that a present frequency of a power grid falls within a frequency modulation constant band, the power conversion system determines, based on a preset mapping relationship between a SoC value and an active power, a first specified active power value corresponding to the SoC value of the target energy storage battery, and controls, based on the first specified active power value, the target energy storage battery to be charged or discharged, so that the SoC value of the target energy storage battery can reach the target SoC value.

20 Claims, 8 Drawing Sheets

(51) Int. Cl.
*H02J 3/34* (2006.01)
*H02J 7/00* (2006.01)

(58) Field of Classification Search
CPC ........ H02J 7/0014; H02J 7/00712; H02J 3/24; H02J 7/00
USPC .......................................................... 307/11
See application file for complete search history.

(56) References Cited

FOREIGN PATENT DOCUMENTS

| | | |
|---|---|---|
| CN | 102891495 A | 1/2013 |
| CN | 108365621 A | 8/2018 |
| CN | 111740434 A | 10/2020 |

OTHER PUBLICATIONS

Extended European Search Report in European Appln No. 21942391.0, dated Jun. 12, 2024, 7 pages.
EP Communication Pursuant to Article 94(3) EPC in European Appln. No. 21942391.0, mailed on Mar. 17, 2025, 8 pages.

* cited by examiner

ENERGY STORAGE SYSTEM, POWER CONVERSION SYSTEM, AND METHOD FOR OPTIMIZING PRIMARY FREQUENCY MODULATION

CROSS-REFERENCE TO RELATED APPLICATIONS

This application is a continuation of International Application No. PCT/CN2021/096865, filed on May 28, 2021, the disclosure of which is hereby incorporated by reference in its entirety.

TECHNICAL FIELD

This application relates to the field of energy technologies, and in particular, to an energy storage system, a power conversion system, and a method for optimizing primary frequency modulation.

BACKGROUND

In recent years, a greater electric energy yield is brought by new energy power stations, for example, wind energy and solar energy. However, the new energy power stations have a characteristic of unstable power generation. This may impact a power grid and cause frequency stability of the power grid to deteriorate.

To keep a frequency of the new energy power station stable, it is proposed in the industry that an energy storage system in the new energy power station participates in primary frequency modulation. The primary frequency modulation means a process in which a frequency change of the power grid is monitored, and when the frequency of the power grid deviates from a rated frequency, a control system in the new energy power station automatically controls an increase or a decrease of an active power transmitted to the power grid to limit the frequency change of the power grid and keep the frequency of the power grid stable. However, in the primary frequency modulation manner in the industry, a preset frequency range near the rated frequency is defined as a frequency modulation constant band (also referred to as a "dead zone" or a "non-frequency modulation zone"). In the preset frequency range, the frequency of the power grid is not modulated. In other words, the active power is not adjusted. Therefore, in a process in which the energy storage system participates in the primary frequency modulation, in the frequency modulation constant band, the frequency change of the power grid is not detected, and the increase or the decrease of the active power is not controlled.

However, if the energy storage system is equivalently charged or discharged for a long time, an energy storage battery in the energy storage system is fully charged (that is, in a specific time period, accumulated charged energy is greater than accumulated discharged energy) or discharged (that is, in a specific time period, accumulated charged energy is less than accumulated discharged energy). As a result, the energy storage system cannot continuously participate in a primary frequency modulation service, thereby reducing a service time of the primary frequency modulation service. An important yield indicator of the primary frequency modulation service is the service time of the frequency modulation.

Therefore, how to prolong the service time in which the energy storage system participates in the primary frequency modulation to improve a yield of the primary frequency modulation service is worthy of thinking deeply.

SUMMARY

This application provides an energy storage system, a power conversion system, and a method for optimizing primary frequency modulation, to prolong a time period in which the energy storage system participates in a primary frequency modulation service, thereby improving a yield of the frequency modulation service.

According to a first aspect, an embodiment of this application provides an energy storage system.

In an example, the energy storage system may include a battery management system, a power conversion system, and a plurality of energy storage batteries. Each of the plurality of energy storage batteries is configured to store or release electric energy. The battery management system is separately connected to the power conversion system and each of the energy storage batteries, and may be configured to monitor a state of charge SoC value, a voltage value, and a current value of each of the energy storage batteries. The power conversion system is separately connected to each of the energy storage batteries and a power grid, and may be configured to: obtain the SoC value of each of the energy storage batteries, and determine, based on the SoC value of each of the energy storage batteries, that a SoC value of a target energy storage battery does not meet a target SoC value; and when a present frequency of the power grid falls within a frequency modulation constant band (that is, a first preset frequency range of the power grid), control, based on a preset mapping relationship between a SoC value and an active power, the target energy storage battery to be charged or discharged, so that the SoC value that is of the target energy storage battery and that is monitored by the battery management system reaches the target SoC value.

In a possible design, when the power conversion system controls, based on the preset mapping relationship between a SoC value and an active power, the target energy storage battery to be charged or discharged, the power conversion system is specifically configured to: determine a first specified active power value based on the mapping relationship, and control, based on the first specified active power value, the target energy storage battery to be charged or discharged, so that the SoC value that is of the target energy storage battery and that is monitored by the battery management system reaches the target SoC value.

It should be understood that the first preset frequency range may be set by a user according to an actual requirement. This is not specifically limited herein.

In a possible design, the power conversion system may receive the SoC value of each of the energy storage batteries from the battery management system.

In another possible design, the power conversion system may receive a voltage value and a current value of each of the energy storage batteries from the battery management system, and may further calculate the SoC value of each of the energy storage batteries based on the voltage value and the current value.

In this embodiment of this application, when the power conversion system determines that the SoC value of the target energy storage battery does not meet the target SoC value and determines that the present frequency of the power grid connected to the power conversion system falls within the frequency modulation constant band, the power conversion system may determine, based on the preset mapping relationship between a SoC value and an active power, a first specified active power value corresponding to the SoC value of the target energy storage battery, and control, based on the first specified active power value, the target energy storage battery to be charged or discharged, so that the SoC value that is of the target energy storage battery and that is monitored by the battery management system can reach the target SoC value. In this way, the energy storage battery can be effectively prevented from being excessively fully charged or discharged, so that the energy storage system can continuously participate in a frequency modulation service. Therefore, a time period in which the energy storage system participates in the primary frequency modulation service is effectively prolonged, thereby effectively improving a yield of the frequency modulation service.

In a possible design, in the preset mapping relationship between a SoC value and an active power, a lower limit value of the SoC may correspond to a lower limit value of the active power in the frequency modulation constant band, an upper limit value of the SoC may correspond to an upper limit value of the active power in the frequency modulation constant band, and an active power corresponding to the target SoC value is zero. The lower limit value of the active power is a minimum value of a charge power, and the upper limit value of the active power is a maximum value of a discharge power.

In this design, a correspondence between the lower limit value of the SoC value and the minimum value of the charge power is established, and a correspondence between the upper limit value of the SoC value and the maximum value of the discharge power is established, so that the power conversion system can flexibly perform charging and discharging based on the SoC value of the energy storage battery. In other words, when the SoC value is relatively small, the target energy storage battery can be charged in time; or when the SoC value is relatively large, the target energy storage battery can be discharged in time, so that the target energy storage battery is effectively prevented from being fully charged or discharged.

There are a plurality of implementations in which the power conversion system determines the first specified active power value corresponding to the SoC value of the target energy storage battery. The implementations include but are not limited to the following manners:

Manner 1: The power conversion system obtains the first specified active power value based on a difference between the SoC value of the target energy storage battery and the target SoC value and a feedforward power of the target energy storage battery. The feedforward power is determined based on a feedforward model of the SoC value of the target energy storage battery. The feedforward model is determined based on the mapping relationship. Input of the feedforward model is the SoC value of the target energy storage battery, and output of the feedforward model is the feedforward power of the SoC value of the target energy storage battery.

Specifically, the feedforward model of the active power is established based on the mapping relationship. The input of the feedforward model is the SoC value of the target energy storage battery, and the output of the feedforward model is the feedforward power of the active power. A target feedforward power corresponding to the SoC value of the target energy storage battery is determined based on the feedforward model. The difference between the SoC value of the target energy storage battery and the target SoC value is determined. The difference is input to a PI controller, to obtain one specified active power value. The specified active power value and the target feedforward power are added to obtain the first specified active power value.

The feedforward model may satisfy the following formula:

$$P_{feed}(SOC) = \begin{cases} \dfrac{-P_L}{SOC^* - SOC_{down}} SOC + \dfrac{P_L}{SOC^* - SOC_{down}} SOC^* & SOC \le SOC^* \\ \dfrac{-P_H}{SOC^* - SOC_{up}} SOC + \dfrac{P_H}{SOC^* - SOC_{up}} SOC^* & SOC > SOC^* \end{cases}$$

Herein, $P_{feed}(SOC)$ is the feedforward power, $P_L$ is the minimum value of the charge power of the target energy storage battery, $P_H$ is the maximum value of the discharge power of the target energy storage battery, $SOC_{down}$ is the lower limit value of the SoC, $SOC_{up}$ is the upper limit value of the SoC, $SOC^*$ is the target SoC value, and SOC is the SoC value of the target energy storage battery.

In Manner 1, the power conversion system may construct the feedforward model based on the mapping relationship, input the SoC value of the target energy storage battery to the feedforward model to obtain the target feedforward power, and determine the first specified active power value of the target energy storage battery based on the target feedforward power and the difference between the SoC value of the target energy storage battery and the target SoC value. In this way, the determined first specified active power value corresponding to the SoC value of the target energy storage battery is more accurate, and a closed-loop adjustment speed for the SoC value of the target energy storage battery is subsequently effectively enhanced.

Manner 2: The power conversion system obtains the first specified active power value based on the difference between the SoC value of the target energy storage battery and the target SoC value.

Specifically, the power conversion system determines the difference between the SoC value of the target energy storage battery and the target SoC value, and inputs the difference to a transfer function of a PI controller to obtain the first specified active power value. The transfer function is determined based on the mapping relationship.

In Manner 2, the feedforward model does not need to be designed for the power conversion system, and the power conversion system may determine the first specified active power value of the target energy storage battery based on only the difference between the SoC value of the target energy storage battery and the target SoC value.

In a possible design, when the power conversion system is configured to control, based on the first specified active power value, the target energy storage battery to be charged or discharged, the power conversion system is specifically configured to: establish an equivalent model of the target energy storage battery, where input of the equivalent model is a charge current or a discharge current of the target energy storage battery, and output of the equivalent model is the SoC value of the target energy storage battery; input the first specified active power value to a power closed-loop transfer function to obtain a first specified current value; and input the first specified current value to a current closed-loop transfer function to obtain the charge current or the discharge current.

If the charge current is obtained, the charge current may be input to the equivalent model to control the target energy storage battery to be charged, so that the SoC value that is of the target energy storage battery and that is monitored by the battery management system reaches the target SoC value.

If the discharge current is obtained, the discharge current may be input to the equivalent model to control the target energy storage battery to be discharged, so that the SoC value that is of the target energy storage battery and that is monitored by the battery management system reaches the target SoC value.

In this design, the power conversion system constructs the equivalent model of the target energy storage battery, and controls, based on the first specified active power value of the target energy storage battery, the target energy storage battery to be charged or discharged. In this way, closed-loop adjustment can be efficiently and quickly performed on the SoC value of the target energy storage battery, to prevent in time the energy storage battery from being fully charged or discharged.

In a possible design, when determining that the present frequency of the power grid falls within a second preset frequency range beyond the frequency modulation constant band, the power conversion system may further determine a frequency modulation curve based on a first frequency when the frequency of the power grid falls outside the frequency modulation constant band, a target active power corresponding to the first frequency, a preset second frequency, and a target active power corresponding to the second frequency, and perform droop control on the active power of the target energy storage battery based on the frequency modulation curve.

It should be understood that the second preset frequency range is different from the first preset frequency range, and may be set by the user according to an actual requirement. This is not specifically limited herein.

In this design, the power conversion system may dynamically reconstruct the frequency modulation curve based on the frequency when the frequency of the power grid falls outside the frequency modulation constant band and the target active power corresponding to the frequency, so that the active power can change smoothly. In this way, impact on the power grid is reduced, and friendliness to the power grid is enhanced.

In a possible design, after the power conversion system performs droop control on the active power of the target energy storage battery based on the frequency modulation curve, the power conversion system may further obtain the present frequency of the power grid; determine a second specified active power value based on the frequency modulation curve and the present frequency of the power grid; and control, based on the second specified active power value, the target energy storage battery to be charged or discharged, to stabilize the frequency of the power grid.

In this design, the power conversion system may determine, based on the reconstructed frequency modulation curve, a third specified active power value corresponding to the present frequency of the power grid; and control, based on the third specified active power value, the target energy storage battery to be charged or discharged, to stabilize the frequency of the power grid. In this way, frequency modulation is flexibly performed on the frequency of the power grid, thereby effectively improving user experience.

According to a second aspect, an embodiment of this application further provides a power conversion system. The power conversion system is separately connected to a battery management system, a power grid, and a plurality of energy storage batteries in an energy storage system. Therefore, the power conversion system may be configured to: obtain a SoC value of each of the plurality of energy storage batteries, and determine, based on the SoC value of each of the energy storage batteries, a target energy storage battery whose SoC value does not meet a target SoC value; and when a present frequency of the power grid falls within a frequency modulation constant band (that is, a first preset frequency range of the power grid), control, based on a preset mapping relationship between a SoC value and an active power, the target energy storage battery to be charged or discharged, so that the SoC value that is of the target energy storage battery and that is monitored by the battery management system reaches the target SoC value.

It should be understood that the first preset frequency range may be set by a user according to an actual requirement. This is not specifically limited herein.

In a possible design, the power conversion system may receive the SoC value of each of the energy storage batteries from the battery management system.

In another possible design, the power conversion system may receive a voltage value and a current value of each of the energy storage batteries from the battery management system, and may further calculate the SoC value of each of the energy storage batteries based on the voltage value and the current value.

According to a third aspect, an embodiment of this application further provides a method for optimizing primary frequency modulation. An energy storage system includes a battery management system, a power conversion system, and a plurality of energy storage batteries. The battery management system is separately connected to the power conversion system and each of the energy storage batteries. The power conversion system is separately connected to each of the energy storage batteries and a power grid. In this method, first, the power conversion system may determine, based on a SoC value of each of the energy storage batteries, a target energy storage battery whose SoC value does not meet a target SoC value. Then, when the power conversion system determines that a present frequency of the power grid falls within a frequency modulation constant band (that is, a first preset frequency range of the power grid), the power conversion system controls, based on a preset mapping relationship between a SoC value and an active power, the target energy storage battery to be charged or discharged, so that the SoC value that is of the target energy storage battery and that is monitored by the battery management system reaches the target SoC value. It should be understood that the first preset frequency range may be set by a user according to an actual requirement. This is not specifically limited herein.

In a possible design, the process in which the power conversion system controls, based on the preset mapping relationship between a SoC value and an active power, the target energy storage battery to be charged or discharged may be specifically that the power conversion system determines a first specified active power value based on the mapping relationship, and controls, based on the first specified active power value, the target energy storage battery to be charged or discharged, so that the SoC value that is of the target energy storage battery and that is monitored by the battery management system reaches the target SoC value.

In a possible design, the power conversion system may receive the SoC value of each of the energy storage batteries from the battery management system.

In another possible design, the power conversion system may receive a voltage value and a current value of each of the energy storage batteries from the battery management system, and may further calculate the SoC value of each of the energy storage batteries based on the voltage value and the current value.

In a possible design, in the preset mapping relationship, a lower limit value of the SoC corresponds to a lower limit value of the active power in the frequency modulation constant band, an upper limit value of the SoC corresponds to an upper limit value of the active power in the frequency modulation constant band, and an active power corresponding to the target SoC value is zero. The lower limit value of the active power is a minimum value of a charge power, and the upper limit value of the active power is a maximum value of a discharge power.

There are a plurality of implementations in which the power conversion system determines the first specified active power value corresponding to the SoC value of the target energy storage battery. The implementations include but are not limited to the following manners:

Manner 1: The power conversion system obtains the first specified active power value based on a difference between the SoC value of the target energy storage battery and the target SoC value and a feedforward power of the target energy storage battery. The feedforward power is determined based on a feedforward model of the SoC value of the target energy storage battery. The feedforward model is determined based on the mapping relationship. Input of the feedforward model is the SoC value of the target energy storage battery, and output of the feedforward model is the feedforward power of the SoC value of the target energy storage battery.

Specifically, the feedforward model of the active power is established based on the mapping relationship. The input of the feedforward model is the SoC value of the target energy storage battery, and the output of the feedforward model is the feedforward power of the active power. A target feedforward power corresponding to the SoC value of the target energy storage battery is determined based on the feedforward model. The difference between the SoC value of the target energy storage battery and the target SoC value is determined. The difference is input to a PI controller, to obtain one specified active power value. The specified active power value and the target feedforward power are added to obtain the first specified active power value.

The feedforward model may satisfy the following formula:

$$P_{feed}(SOC) = \begin{cases} \dfrac{-P_L}{SOC^* - SOC_{down}} SOC + \dfrac{P_L}{SOC^* - SOC_{down}} SOC^* & SOC \leq SOC^* \\ \dfrac{-P_H}{SOC^* - SOC_{up}} SOC + \dfrac{P_H}{SOC^* - SOC_{up}} SOC^* & SOC > SOC^* \end{cases}$$

Herein, $P_{feed}(SOC)$ is the feedforward power, $P_L$ is the minimum value of the charge power of the target energy storage battery, $P_H$ is the maximum value of the discharge power of the target energy storage battery, $SOC_{down}$ is the lower limit value of the SoC, $SOC_{up}$ is the upper limit value of the SoC, $SOC^*$ is the target SoC value, and SOC is the SoC value of the target energy storage battery.

In Manner 1, the power conversion system may construct the feedforward model based on the mapping relationship, input the SoC value of the target energy storage battery to the feedforward model to obtain the target feedforward power, and determine the first specified active power value of the target energy storage battery based on the target feedforward power and the difference between the SoC value of the target energy storage battery and the target SoC value. In this way, the determined first specified active power value corresponding to the SoC value of the target energy storage battery is more accurate, and a closed-loop adjustment speed for the SoC value of the target energy storage battery is subsequently effectively enhanced.

Manner 2: The power conversion system obtains the first specified active power value based on the difference between the SoC value of the target energy storage battery and the target SoC value.

Specifically, the power conversion system determines the difference between the SoC value of the target energy storage battery and the target SoC value, and inputs the difference to a transfer function of a PI controller to obtain the first specified active power value. The transfer function is determined based on the mapping relationship.

In Manner 2, the feedforward model does not need to be designed for the power conversion system, and the power conversion system may determine the first specified active power value of the target energy storage battery based on only the difference between the SoC value of the target energy storage battery and the target SoC value.

It should be understood that, to prevent the energy storage battery from being fully charged or discharged, the power conversion system may perform closed-loop adjustment on the SoC value of the target energy storage battery, so that the SoC value of the energy storage battery reaches the target SoC value. There are a plurality of specific implementations. The implementations include but are not limited to the following manners:

Manner 1: The power conversion system controls, based on the feedforward model and a specified active power value 1 determined by the PI controller, the target energy storage battery to be charged or discharged.

Specifically, the power conversion system establishes an equivalent model of the target energy storage battery. Input of the equivalent model is a charge current or a discharge current of the target energy storage battery, and output of the equivalent model is the SoC value of the target energy storage battery. First, the power conversion system inputs the specified active power value 1 to a power closed-loop transfer function to obtain a first specified current value. Then, the power conversion system inputs the first specified current value to a current closed-loop transfer function to obtain the charge current, and inputs the charge current to the equivalent model to control the target energy storage battery to be charged, so that the SoC value that is of the target energy storage battery and that is monitored by the battery management system reaches the target SoC value. Alternatively, the power conversion system inputs the first specified current value to a current closed-loop transfer function to obtain the discharge current, and inputs the discharge current to the equivalent model to control the target energy storage battery to be discharged, so that the SoC value that is of the target energy storage battery and that is monitored by the battery management system reaches the target SoC value.

Manner 2: The power conversion system directly determines, based on the difference between the SoC value of the target energy storage battery and the target SoC value, a specified active power value 2, and controls the target energy storage battery to be charged or discharged.

Specifically, the power conversion system establishes an equivalent model of the target energy storage battery. Input of the equivalent model is a charge current or a discharge current of the target energy storage battery, and output of the equivalent model is the SoC value of the target energy storage battery. First, the power conversion system determines the difference between the SoC value of the target energy storage battery and the target SoC value, and inputs the difference to a transfer function of the PI controller to obtain the specified active power value 2. Then, the power conversion system inputs the specified active power value 2 to a power closed-loop transfer function to obtain a second specified current value. The power conversion system inputs the second specified current value to a current closed-loop transfer function to obtain the charge current, and inputs the charge current to the equivalent model to control the target energy storage battery to be charged, so that the SoC value that is of the target energy storage battery and that is monitored by the battery management system reaches the target SoC value. Alternatively, the power conversion system inputs the second specified current value to a current closed-loop transfer function to obtain the discharge current, and inputs the discharge current to the equivalent model to control the target energy storage battery to be discharged, so that the SoC value that is of the target energy storage battery and that is monitored by the battery management system reaches the target SoC value.

In a possible design, when the power conversion system determines that the present frequency of the power grid falls within a second preset frequency range beyond the frequency modulation constant band, the power conversion system determines a frequency modulation curve based on a first frequency when the frequency of the power grid falls outside the frequency modulation constant band, a target active power corresponding to the first frequency, a preset second frequency, and a target active power corresponding to the second frequency, and performs droop control on the active power of the target energy storage battery based on the frequency modulation curve.

It should be understood that the second preset frequency range is different from the first preset frequency range, and may be set by the user according to an actual requirement. This is not specifically limited herein.

In a possible design, after the power conversion system performs droop control on the active power of the target energy storage battery based on the frequency modulation curve, the power conversion system may further obtain the present frequency of the power grid; determine, based on the frequency modulation curve, a second specified active power value corresponding to the present frequency of the power grid; and control, based on the second specified active power value, the target energy storage battery to be charged or discharged, to stabilize the frequency of the power grid.

For specific technical effect that can be achieved through the second aspect, the third aspect, and any possible design of the third aspect, refer to the description of the technical effect brought by any possible design of the first aspect. Details are not described herein again.

These aspects or other aspects of this application are more readily apparent from the following description of embodiments.

DESCRIPTION OF EMBODIMENTS

Figure 1:
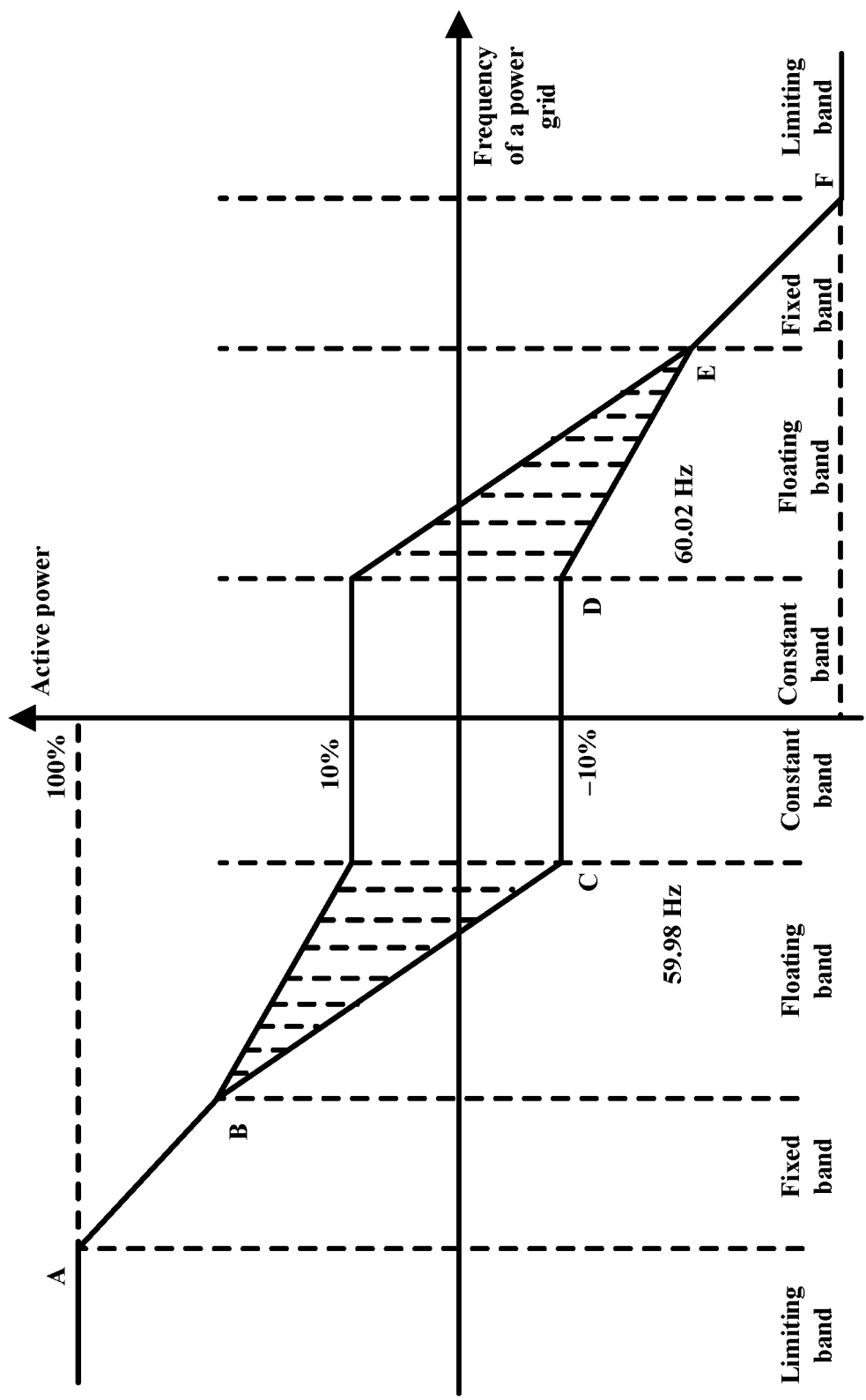
FIG. 1 is a schematic diagram of a relationship between a frequency of a power grid and an active power according to an embodiment of this application.

To make objectives, technical solutions, and advantages of this application clearer, the following further describes this application in detail with reference to the accompanying drawings.

For ease of understanding, the following explains some terms in the embodiments of this application.

(1) Primary frequency modulation means a process in which once a frequency of a power grid deviates from a rated value, a control system of a unit assembly in the power grid automatically controls an increase or a decrease of an active power of the unit assembly to limit a frequency change of the power grid and keep a frequency of the power grid stable.

(2) A frequency modulation constant band is a preset frequency range of the frequency of the power grid. No frequency modulation action is performed within the preset frequency range. To be specific, the frequency change of the power grid is not detected, and the increase or decrease of the active power is not controlled. In the following and related accompanying drawings, the frequency modulation constant band is also briefly referred to as a "constant band".

(3) A state of charge (state of charge, SoC) value is used to indicate a battery level of an energy storage battery. To be specific, the SoC value of the energy storage battery is a ratio of a battery level of the energy storage battery to a battery level when the energy storage battery is fully charged, and is usually represented by a percentage. A value range of the SoC may be 0% to 100%. When the SoC is equal to 0%, it indicates that the energy storage battery is completely discharged. When the SoC is equal to 100%, it indicates that the energy storage battery is fully charged.

(4) SoC closed-loop adjustment: In the frequency modulation constant band, the energy storage battery is controlled to be charged or discharged, so that the SoC value of the energy storage battery reaches a target SoC value. In this way, the battery level is more balanced. Further, it is ensured that the energy storage battery can have sufficient electric power to participate in the primary frequency modulation outside the frequency modulation constant band, thereby prolonging a service time of the frequency modulation.

It should be noted that in description of this application, "at least one" means one or more, and "a plurality of" means two or more. In view of this, in the embodiments of the present invention, "a plurality of" may also be understood as "at least two". The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects unless otherwise stated. In addition, it should be understood that in description of this application, terms such as "first" and "second" are merely used for distinctive description, but should not be understood as indicating or implying relative importance, or should not be understood as indicating or implying a sequence.

In recent years, a greater electric energy yield is brought by new energy power stations, for example, wind energy and solar energy. However, the new energy power stations have a characteristic of unstable power generation. This may impact a power grid and cause frequency stability of the power grid to deteriorate. To keep a frequency of a power system stable, it is proposed in the industry that an energy storage system in the power system participates in primary frequency modulation.

However, in a process in which the energy storage system participates in the primary frequency modulation, when a frequency of a power grid falls within a frequency modulation constant band, a frequency change of the power grid is not detected, and an active power is not adjusted. If an energy storage battery in the energy storage system is continuously equivalently charged or discharged for a long time, the energy storage battery is fully charged or discharged. As a result, the energy storage system cannot continuously participate in a frequency modulation service outside the frequency modulation constant band, and a service time of the frequency modulation that can be provided by the energy storage system is relatively short.

In addition, when the frequency of the power grid falls outside the frequency modulation constant band, the active power is controlled based on only a fixed droop curve. However, the active power fluctuates greatly in the frequency modulation constant band. In addition, there is a step power problem when the frequency of the power grid falls outside the frequency modulation constant band, thereby cause impact on the power grid.

To resolve the foregoing technical problem, an embodiment of this application provides an energy storage system, to prolong a time period in which the energy storage system participates in a primary frequency modulation service, thereby improving a yield of the frequency modulation service.

For ease of understanding, before the technical solutions of this application are described, frequency division of the power grid in the embodiments of this application is first briefly described.

FIG. 1 is a schematic diagram of a relationship between a frequency of a power grid and an active power according to an embodiment of this application. In FIG. 1, a frequency range of the power grid is divided to a limiting band, a fixed band, a floating band, and a constant band.

The limiting band is a frequency range below a frequency corresponding to a point A and a frequency range above a frequency corresponding to a point F. In the two frequency ranges, an active power of an energy storage battery reaches a maximum value.

The fixed band is a frequency range between the frequency corresponding to the point A and a frequency corresponding to a point B, and a frequency range between a frequency corresponding to a point E and the frequency corresponding to the point F. In the two frequency ranges, an increase or a decrease of the active power may be controlled based on a preset frequency modulation curve.

The floating band is a frequency range between the frequency corresponding to the point B and a frequency corresponding to a point C, and a frequency range between a frequency corresponding to a point D and the frequency corresponding to the point E. In the two frequency ranges, the increase or the decrease of the active power may be controlled based on a reconstructed frequency modulation curve.

The fixed band is a frequency range (for example, 59.98 Hz to 60.02 Hz) between the frequency corresponding to the point B and the frequency corresponding to the point C. In the frequency range, closed-loop adjustment may be performed on a SoC, so that a battery level of an energy storage battery in an energy storage system is more balanced. It is ensured that the energy storage battery can have sufficient electric power to participate in primary frequency modulation outside the frequency modulation constant band, thereby prolonging a service time of the frequency modulation.

The energy storage system in this embodiment of this application may be electrically connected to various external loads, to provide electric energy to the external loads. For example, the energy storage system may be electrically connected to the power grid, to provide a charge power or a discharge power to the power grid. Certainly, the energy storage system may also be configured to provide electric energy to other external loads. Examples are not described herein.

Figure 2:
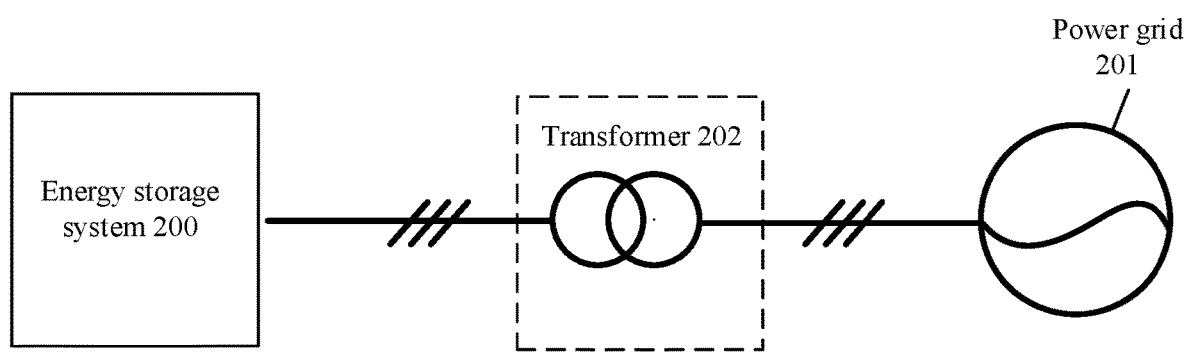
FIG. 2 is a schematic diagram of a scenario to which an embodiment of this application is applicable.

For example, FIG. 2 is a schematic diagram of a scenario to which an embodiment of this application is applicable. In FIG. 2, an energy storage system 200 is connected to a power grid 201, to provide a charge power or a discharge power to the power grid.

Optionally, the energy storage system 200 may be further connected to the power grid 201 via a transformer 202. In this case, the transformer 202 may convert discharge electric energy released by the energy storage battery in the energy storage system 200, and then transmit the converted discharge electric energy to the power grid, so that a voltage of the converted discharge electric energy can adapt to the power grid 201. Alternatively, the transformer 202 may convert electric energy of the power grid 201 to charge electric energy, and then store the charge electric energy in the energy storage battery in the energy storage system 200, so that a voltage of the converted charge electric energy can adapt to the energy storage battery in the energy storage system 200.

Figure 3A:
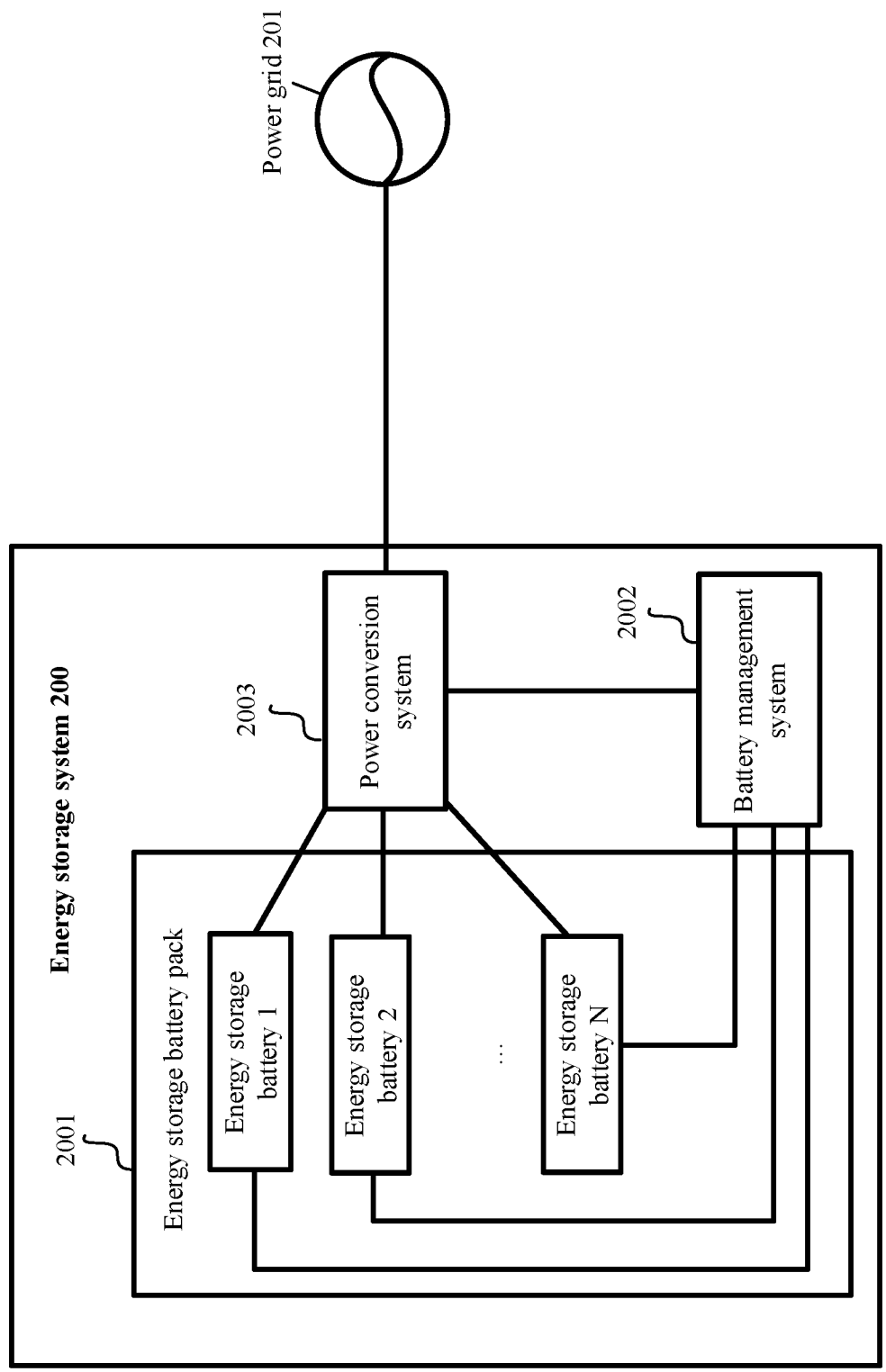
FIG. 3A is a schematic diagram of a possible structure of an energy storage system according to an embodiment of this application.

As shown in FIG. 3A, the energy storage system 200 may include an energy storage battery pack 2001, a battery management system (BMS) 2002, and a power conversion system (PCS) 2003.

The energy storage battery pack 2001 includes a plurality of energy storage batteries (for example, an energy storage battery 1, an energy storage battery 2, . . . , and an energy storage battery N). Each energy storage battery may be configured to store or release electric energy. A value of N is not specifically limited in this embodiment of this application. A person skilled in the art may set the value according to an actual requirement.

Still with reference to FIG. 3A, the battery management system 2002 is separately connected to the power conversion system 2003 and each energy storage battery in the energy storage battery pack 2001, so that the battery management system 2002 can monitor a running status of the energy storage battery pack 2001 and collect information such as a SoC value, a voltage, and a current of each energy storage battery in the energy storage battery pack 2001.

In a possible implementation, the battery management system 2002 may monitor the SoC value of each energy storage battery in the energy storage battery pack 2001, collect the SoC value of each energy storage battery in real time, and send the SoC value to the power conversion system 2003. For example, the battery management system 2002 may collect SoC values of the energy storage battery 1, the energy storage battery 2, and an energy storage battery 3, and send the SoC values to the power conversion system 2003.

Still with reference to FIG. 3A, the power conversion system 2003 may be separately connected to each energy storage battery in the energy storage battery pack 2001, the battery management system 2002, and the power grid 201. Therefore, the power conversion system 2003 may receive the SoC value of each energy storage battery from the battery management system 2002, and determine a target energy storage battery whose SoC value does not meet a target SoC value in the plurality of energy storage batteries. Further, the power conversion system 2003 may further determine a frequency of the power grid; and when determining that the present frequency of the power grid falls within a constant band (that is, a preset frequency range of the power grid), control, based on a preset mapping relationship between a SoC value and an active power, the target energy storage battery to be charged or discharged, so that the SoC value that is of the target energy storage battery and that is monitored by the battery management system 2002 reaches the target SoC value.

For example, the energy storage battery pack 2001 includes the energy storage battery 1, the energy storage battery 2, and the energy storage battery 3. the power conversion system 2003 may receive the SoC values of the energy storage battery 1, the energy storage battery 2, and the energy storage battery 3 from the battery management system 2002. When if it is found that the SoC value of the energy storage battery 1 does not meet the target SoC value, the energy storage battery 1 is used as the target energy storage battery. Then, the power conversion system 2003 determines that the present frequency of the power grid falls within the frequency modulation constant band, and controls, based on the preset mapping relationship between a SoC value and an active power, the energy storage battery 1 to be charged or discharged, so that the SoC value that is of the target energy storage battery 1 and that is monitored by the battery management system 2002 reaches the target SoC value.

When the power conversion system 2003 in the energy storage system 200 provided in this embodiment of this application determines that the SoC value of the target energy storage battery does not meet the target SoC value and determines that the present frequency of the power grid falls within the frequency modulation constant band, the power conversion system 2003 may determine a first specified active power value based on the preset mapping relationship between a SoC value and an active power, and control, based on the first specified active power value, the target energy storage battery to be charged or discharged, so that the SoC value that is of the target energy storage battery and that is monitored by the battery management system 2002 reaches the target SoC value. In this way, the target energy storage battery can be effectively prevented from being fully charged or discharged, so that the energy storage system can continuously participate in a frequency modulation service. Therefore, a time period in which the energy storage system participates in the primary frequency modulation service is effectively prolonged, thereby improving a yield of the frequency modulation service.

Figure 3B:
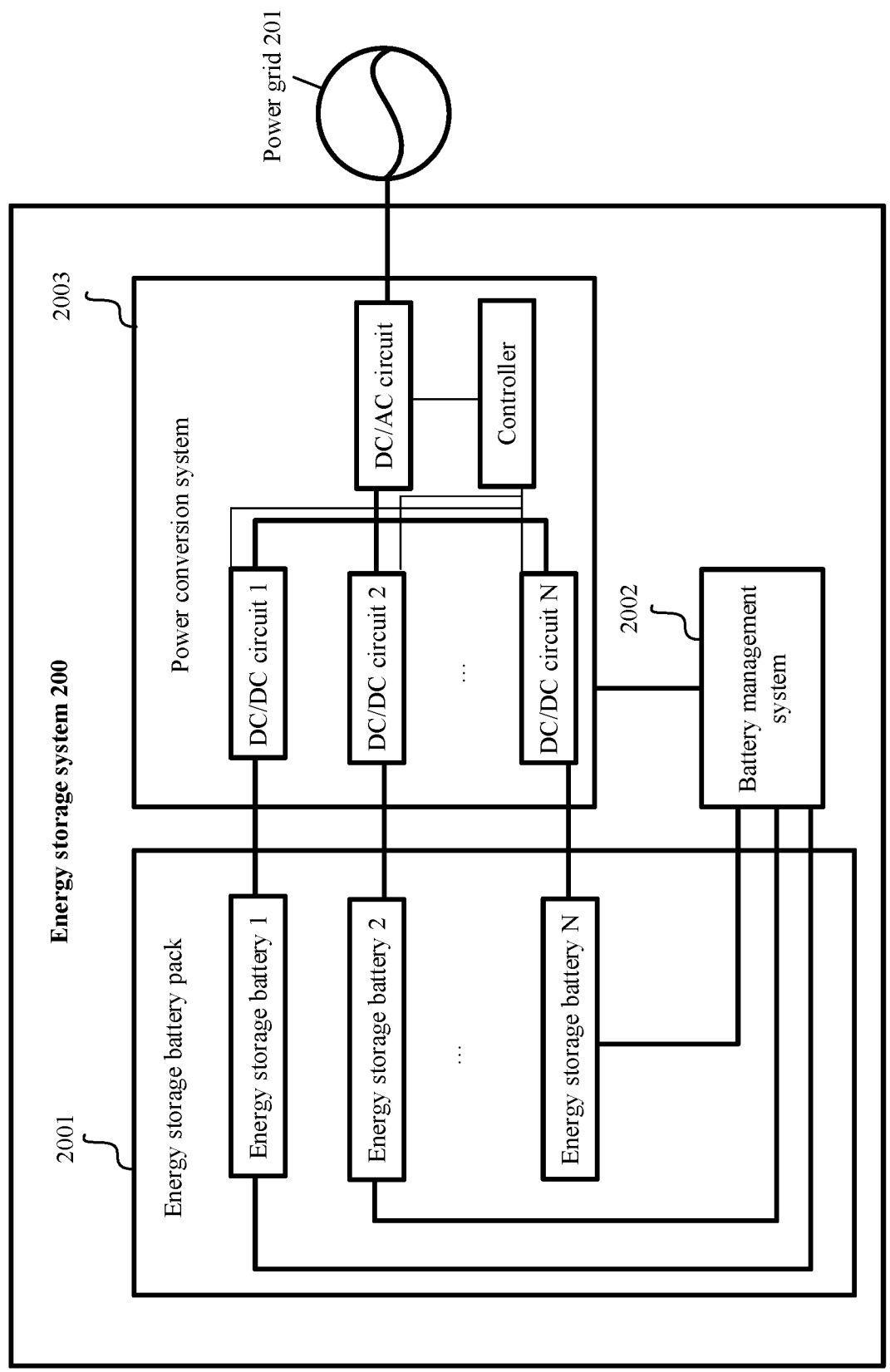
FIG. 3B is a schematic diagram of a specific structure of an energy storage system according to an embodiment of this application.

Based on a same technical concept, this application further provides a power conversion system, for example, the power conversion system 2003 shown in FIG. 3B. The power conversion system 2003 may be separately connected to the battery management system 2002, the power grid 201, and the plurality of energy storage batteries. Therefore, the power conversion system 2003 may be configured to determine, based on the SoC value of each of the energy storage batteries, the target energy storage battery whose SoC value does not meet the target SoC value; and when determining that the present frequency of the power grid falls within the frequency modulation constant band, control, based on the preset mapping relationship between a SoC value and an active power, the target energy storage battery to be charged or discharged, so that the SoC value that is of the target energy storage battery and that is monitored by the battery management system reaches the target SoC value.

For example, as shown in FIG. 3B, the power conversion system 2003 may include a plurality of DC/DC circuits, one DC/AC circuit, and one controller. Each DC/DC circuit is connected to each energy storage battery in the energy storage battery pack 2001 in a one-to-one correspondence (for example, the energy storage battery 1 is connected to a DC/DC circuit 1, the energy storage battery 2 is connected to a DC/DC circuit 2, and by analogy, the energy storage battery N is connected to a DC/DC circuit N). The plurality of DC/DC circuits are connected in parallel and then connected to the DC/AC circuit. The DC/AC circuit is connected to the power grid 201. The controller is separately connected to the DC/AC circuit and each DC/DC circuit.

In a possible implementation, when the controller determines that the SoC value of the energy storage battery 1 is less than the target SoC value, and the present frequency of the power grid 201 falls within the frequency modulation constant band, the DC/AC circuit may convert an alternating current of the power grid 201 to a direct current, and transmit the direct current to the DC/DC circuit 1. In addition, the controller may send a charge instruction (that is, a power control instruction) to the DC/DC circuit 1, and the DC/DC circuit 1 transmits the direct current to the energy storage battery 1 according to the instruction, to charge the energy storage battery 1.

In another possible implementation, when the controller determines that the SoC value of the energy storage battery 1 is greater than the target SoC value, and the present frequency of the power grid 201 falls within the frequency modulation constant band, the controller may send a discharge instruction (that is, a power control instruction) to the DC/DC circuit 1. The DC/DC circuit 1 may transmit, according to the instruction, the direct current discharged from the energy storage battery 1 to the DC/AC circuit. Therefore, the DC/AC circuit may convert the direct current discharged from the energy storage battery to an alternating current and transmit the alternating current back to the power grid 201, thereby implementing discharge of the energy storage battery 1. Alternatively, the DC/DC circuit 1 may transmit, according to the instruction, the direct current discharged from the energy storage battery 1 to the power grid 201.

Optionally, the controller determines that the SoC value of the energy storage battery 1 is less than the target SoC value, determines that the SoC value of the energy storage battery 2 is greater than the target SoC value, and sends a discharge instruction (a power control instruction) to the DC/DC circuit 2 connected to the energy storage battery 2, so that the DC/DC circuit 2 transmits the direct current discharged from the energy storage battery 1 to the DC/DC circuit 1, and the DC/DC circuit 1 transmits the direct current to the energy storage battery 1, to implement charge of the energy storage battery 1 and discharge of the energy storage battery 2.

Certainly, the power conversion system 2003 may alternatively have another structure. FIG. 3B is merely an example instead of limitation.

It should be noted that, in this embodiment of this application, optimization for primary frequency modulation mainly relates to the following two scenarios:

Scenario 1: The frequency of the power grid 201 falls within the frequency modulation constant band (that is, a first preset frequency range), and the SoC value of the target energy storage battery does not meet the target SoC value.

Scenario 2: The frequency of the power grid 201 falls within a second preset frequency range outside the frequency modulation constant band (that is, the floating band described above), and the SoC value of the target energy storage battery does not meet the target SoC value.

The embodiments of this application provide different methods for optimizing primary frequency modulation for the two scenarios. The following separately describes the methods.

Figure 4:
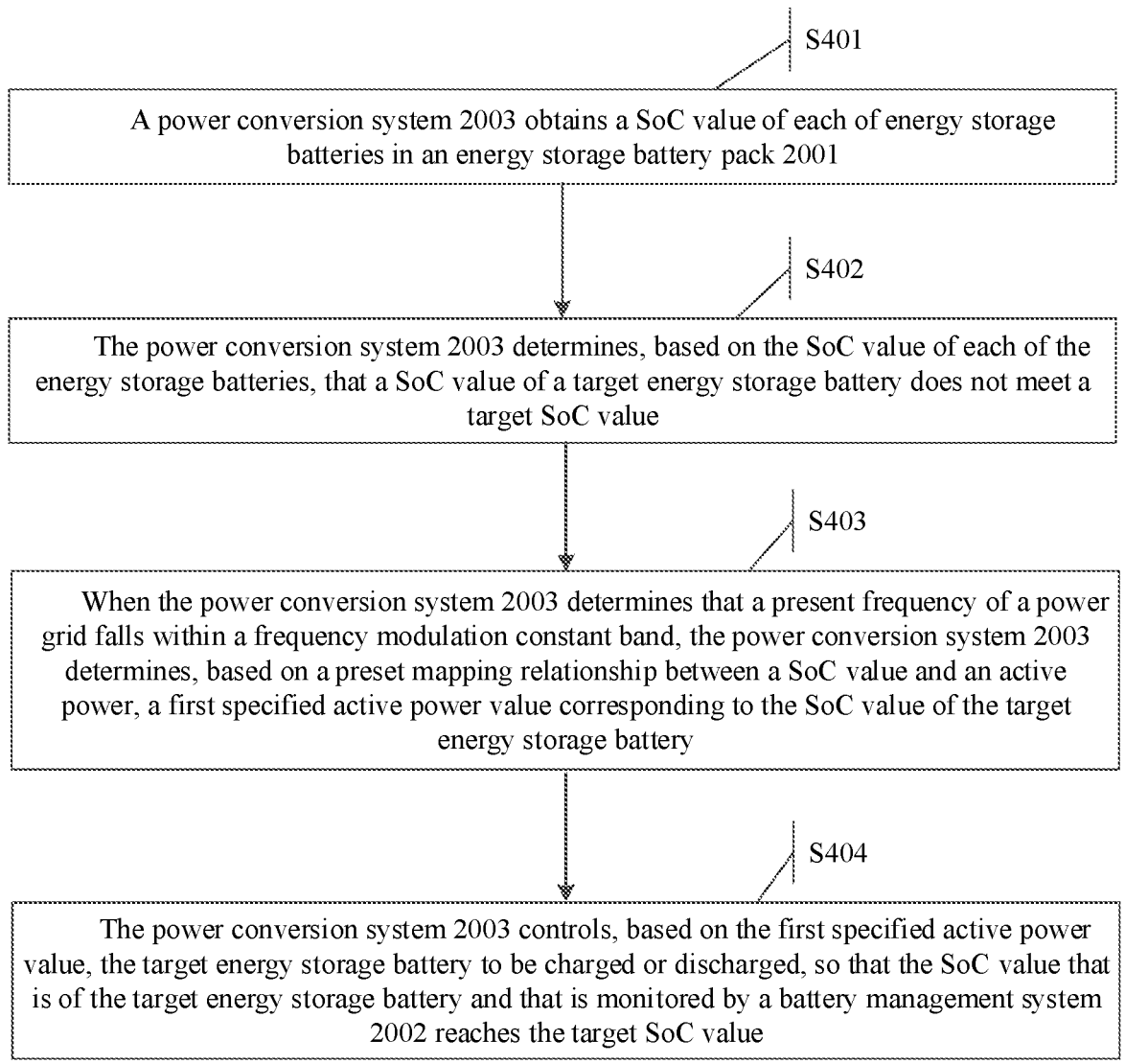
FIG. 4 is a schematic flowchart of a method for optimizing primary frequency modulation according to an embodiment of this application.

FIG. 4 is a schematic flowchart of a method for optimizing primary frequency modulation according to an embodiment of this application. The method is applicable to Scenario 1, and may be performed by the power conversion system 2003. The method includes the following steps.

S401: The power conversion system 2003 obtains the SoC value of each of the energy storage batteries in the energy storage battery pack 2001.

In a possible implementation, the power conversion system 2003 may receive the SoC value of each of the energy storage batteries in the energy storage battery pack 2001 from the battery management system 2002.

In another possible implementation, the power conversion system 2003 may receive a voltage value and a current value of each of the energy storage batteries in the energy storage battery pack 2001 from the battery management system 2002, and may further calculate the SoC value of each of the energy storage batteries based on the voltage value and the current value.

S402: The power conversion system 2003 determines, based on the SoC value of each of the energy storage batteries, that the SoC value of the target energy storage battery does not meet the target SoC value.

It may be understood that the target SoC value may be a value pre-stored in the power conversion system 2003, or may be obtained by the power conversion system 2003 from an energy management system (EMS), a host computer, or the like. A specific value of the target SoC value may be set by a skilled person according to an actual requirement, for example, may be 50% or 60%. This is not specifically limited in this embodiment of this application.

For example, the energy storage battery is the energy storage battery 1, the energy storage battery 2, or the energy storage battery 3 in FIG. 3A. The power conversion system 2003 may receive the SoC values of the energy storage battery 1, the energy storage battery 2, and the energy storage battery 3 from the battery management system 2002, and determine, from the energy storage battery 1, the energy storage battery 2, and the energy storage battery 3, the target energy storage battery whose SoC value does not meet the target SoC value.

S403: When determining that the present frequency of the power grid 201 falls within the frequency modulation constant band, the power conversion system 2003 determines, based on a preset mapping relationship between a SoC value and an active power, a first specified active power value corresponding to the SoC value of the target energy storage battery.

In a possible implementation, the power conversion system 2003 may collect a voltage of the power grid 201, calculate the present frequency of the power grid 201 based on the voltage, and compare the present frequency of the power grid 201 with a frequency range corresponding to the frequency modulation constant band, to determine whether the present frequency of the power grid 201 falls within the frequency modulation constant band.

There are a plurality of manners of calculating the frequency of the power grid 201. This is not specifically limited in this embodiment of this application. For example, the power conversion system 2003 may determine the present instantaneous frequency of the power grid 201 based on a quantity of times that a voltage collected in a preset period is zero, a time interval between two times that the voltage is zero, and a voltage obtained through present sampling.

It should be understood that, in the foregoing preset mapping relationship between a SoC value and an active power, a lower limit value of the SoC may correspond to a lower limit value (that is, a minimum value of a charge power) of an active power in the frequency modulation constant band, and an upper limit value of the SoC may correspond to an upper limit value (that is, a maximum value of a discharge power) of an active power in the frequency modulation constant band. An active power corresponding to the target SoC value is zero. The minimum value of the charge power and the maximum value of the discharge power may be set by a person skilled in the art according to an actual requirement. This is not specifically limited in this application.

Figure 5:
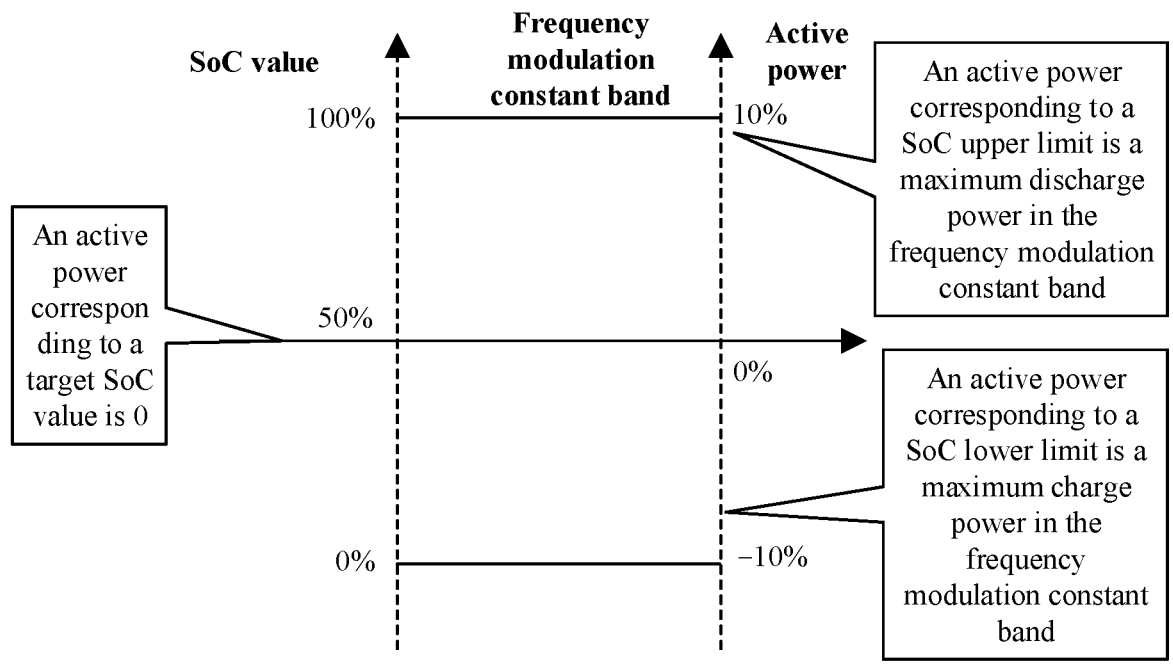
FIG. 5 is a schematic diagram of a relationship between a SoC value and an active power according to an embodiment of this application.

For example, with reference to FIG. 5, if the lower limit value of the SoC is 0%, the lower limit value of the active power in the frequency modulation constant band may be the minimum value of the charge power: −10%. If the target SoC value is 0%, the corresponding active power is 0. If the upper limit value of the SoC is 100%, the upper limit value of the active power in the frequency modulation constant band may be a maximum value of the discharge power: 10%. In this way, a correspondence between the lower limit value of the SoC value and the minimum value of the charge power is established, and a correspondence between the upper limit value of the SoC value and the maximum value of the discharge power is established, so that the power conversion system 2003 can flexibly perform charging and discharging through controlling the SoC value of the energy storage battery.

S404: The power conversion system 2003 controls, based on the first specified active power value, the target energy storage battery to be charged or discharged, so that the SoC value that is of the target energy storage battery and that is monitored by the battery management system 2002 reaches the target SoC value.

It should be noted that there are the following two cases in which the SoC value of the target energy storage battery in step S403 does not meet the target SoC value. The following separately describes different cases.

Case 1: The SoC value of the target energy storage battery is greater than the target SoC value.

In Case 1, that the SoC value of the target energy storage battery is greater than the target SoC value may be understood as that the target energy storage battery has a relatively high battery level and is prone to an overcharged state. Therefore, the power conversion system 2003 controls, based on the first specified active power value, the target energy storage battery to be discharged, so that the SoC value that is of the target energy storage battery and that is monitored by the battery management system 2002 reaches the target SoC value.

Case 2: The SoC value of the target energy storage battery is less than the target SoC value.

In Case 2, that the SoC value of the target energy storage battery is less than the target SoC value may be understood as that the target energy storage battery has a relatively low battery level and is prone to a completely discharged state. Therefore, the power conversion system 2003 controls, based on the first specified active power value, the target energy storage battery to be charged, so that the SoC value that is of the target energy storage battery and that is monitored by the battery management system 2002 reaches the target SoC value.

It should be understood that there are a plurality of implementations in which the power conversion system 2003 in step S403 determines, based on the preset mapping relationship between a SoC value and an active power, the first specified active power value corresponding to the SoC value of the target energy storage battery. The implementations include but are not limited to the following manners:

Manner 1: The power conversion system 2003 establishes a feedforward model of the active power (that is, a dashed line part in FIG. 6) based on the mapping relationship. Input of the feedforward model is the SoC value of the target energy storage battery, and output of the feedforward model is a feedforward power of the active power. Further, the power conversion system 2003 may determine, based on the feedforward model, a target feedforward power corresponding to the SoC value of the target energy storage battery; determine a difference between the SoC value of the target energy storage battery and the target SoC value; input the difference to a transfer function of a PI controller to obtain a specified active power value 1; and add the specified active power value 1 and the target feedforward power to obtain the first specified active power value.

In Manner 1, the power conversion system may construct the feedforward model based on the mapping relationship, input the SoC value of the target energy storage battery to the feedforward model to obtain the target feedforward power, and determine the first specified active power value of the target energy storage battery based on the target feedforward power and the difference between the SoC value of the target energy storage battery and the target SoC value. In this way, the determined first specified active power value corresponding to the SoC value of the target energy storage battery is more accurate.

For example, the feedforward model may satisfy the following formula:

$P_{feed}(SOC) =$ $$\begin{cases} \dfrac{-P_L}{SOC^* - SOC_{down}}SOC + \dfrac{P_L}{SOC^* - SOC_{down}}SOC^* & SOC \leq SOC^* \\ \dfrac{-P_H}{SOC^* - SOC_{up}}SOC + \dfrac{P_H}{SOC^* - SOC_{up}}SOC^* & SOC > SOC^* \end{cases}$$

Herein, $P_{feed}(SOC)$ is the feedforward power, $P_L$ is the minimum value of the charge power of the target energy storage battery, $P_H$ is the maximum value of the discharge power of the target energy storage battery, $SOC_{down}$ is the lower limit value of the SoC, $SOC_{up}$ is the upper limit value of the SoC, $SOC^*$ is the target SoC value, and SOC is the SoC value of the target energy storage battery.

Manner 2: The power conversion system 2003 determines the difference between the SoC value of the target energy storage battery and the target SoC value, and inputs the difference to the transfer function of the PI controller to obtain the first specified active power value.

The transfer function (that is, an integral function and a proportional function) of the PI controller is determined based on the mapping relationship. Specifically, the mapping relationship is shown in Table 1. In the mapping relationship, $P_L$ is the minimum value of the charge power of the target energy storage battery; and $P_H$ is the minimum value of the discharge power of the target energy storage battery. If the difference $\Delta SOC$ between the SoC value of the target energy storage battery and the target SoC value is a negative value, $\Delta SOC$ is input to the transfer function of the PI controller, and the obtained first specified active power value $P_1$ is the charge power. A specific value is $P_L < P_1 < 0$. If the difference $\Delta SOC$ between the SoC value of the target energy storage battery and the target SoC value is a positive value, $\Delta SOC$ is input to the transfer function of the PI controller, and the obtained first specified active power value $P_1$ is the discharge power. A specific value is $0 < P_1 < P_H$.

TABLE 1

| Difference between the SoC value of the target energy storage battery and the target SoC value | First specified active power value |
|---|---|
| $\Delta SoC < 0$ | $P_L < P_1 < 0$ |
| $\Delta SoC < 0$ | 0 |
| $\Delta SoC < 0$ | $0 < P_1 < P_H$ |

In Manner 2, the feedforward model does not need to be designed for the power conversion system, and the power conversion system may determine the first specified active power value of the target energy storage battery based on only the difference between the SoC value of the target energy storage battery and the target SoC value. In this way, efficiency of obtaining the first specified active power value is relatively high.

To enable the SoC value of the target energy storage battery to reach the target SoC value, this embodiment of this application proposes performing closed-loop control on the SoC value of the target energy storage battery. When it is determined that there are a plurality of implementations of determining the first specified active power value, there are also a plurality of implementations of performing closed-loop control based on the first specified active power value. The implementations include but are not limited to the following implementations.

Manner 1: The power conversion system 2003 establishes an equivalent model of the target energy storage battery, and performs closed-loop control on the SoC value based on the first specified active power value 1 that is determined based on the feedforward power of the target energy storage battery and the difference between the SoC value of the target energy storage battery and the target SoC value.

Figure 6:
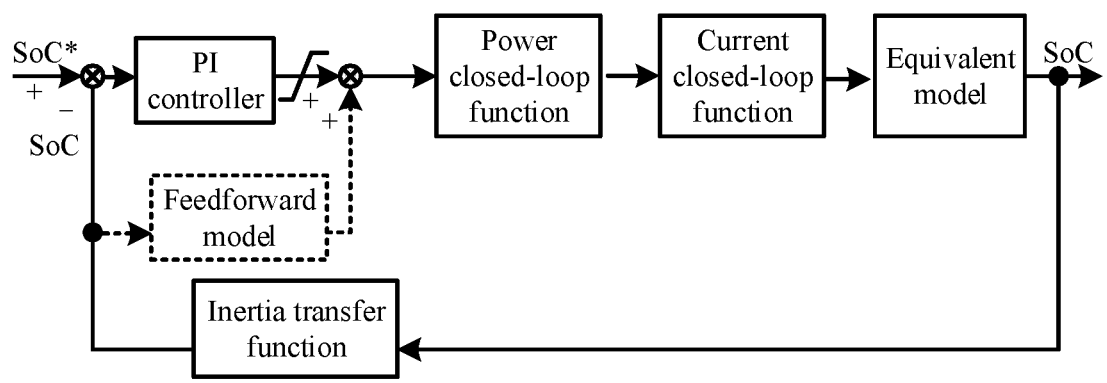
FIG. 6 is a schematic diagram of principles of performing closed-loop control on a SoC value according to an embodiment of this application.

Specifically, with reference to FIG. 6, SoC* is the target SoC value of the target energy storage battery, and SoC is the present SoC value of the target energy storage battery. The power conversion system 2003 inputs the present SoC value of the target energy storage battery to the feedforward model $P_{feed}(SOC)$ to obtain the target feedforward power of the target energy storage battery, and inputs the difference between the SoC value of the target energy storage battery and the target SoC value to the transfer function of the PI controller to obtain a second specified active power value. The power conversion system 2003 then adds the second specified active power value and the target feedforward power to obtain the first specified active power value 1, inputs the first specified active power value 1 to a power closed-loop transfer function to obtain a first specified current value, and inputs the first specified current value to a current closed-loop transfer function to obtain a charge current or a discharge current. If the charge current is obtained, the charge current is input to the equivalent model of the target energy storage battery, and the target energy storage battery is controlled to be charged, so that the SoC value that is of the target energy storage battery and that is monitored by the battery management system 2002 reaches the target SoC value. If the discharge current is obtained, the discharge current is input to the equivalent model of the target energy storage battery, and the target energy storage battery is controlled to be discharged, so that the SoC value that is of the target energy storage battery and that is monitored by the battery management system 2002 reaches the target SoC value.

In Manner 1, the power conversion system 2003 controls, based on the first specified active power value 1 determined based on the target feedforward power and the difference between the SoC value of the target energy storage battery and the target SoC value, the target energy storage battery to be charged or discharged. In this way, closed-loop adjustment can be efficiently and quickly performed on the SoC value of the target energy storage battery, to prevent in time the energy storage battery from being fully charged or discharged.

Manner 2: The power conversion system 2003 establishes an equivalent model of the target energy storage battery, determines a first specified active power value 2 based on the difference between the SoC value of the target energy storage battery and the target SoC value, and then performs closed-loop control on the SoC value based on the first specified active power value 2.

Specifically, still with reference to FIG. 6, SoC* is the target SoC value of the target energy storage battery, and SoC is the present SoC value of the target energy storage battery. The power conversion system 2003 determines the difference between the present SoC value of the target energy storage battery and the target SoC value, and inputs the difference to the transfer function of the PI controller, so that the first specified active power value 2 can be obtained. The power conversion system 2003 then inputs the first specified active power value 2 to the power closed-loop transfer function to obtain a second specified current value, and inputs the second specified current value to the current closed-loop transfer function to obtain a charge current or a discharge current. If the charge current is obtained, the charge current is input to the equivalent model of the target energy storage battery, and the target energy storage battery is controlled to be charged, so that the SoC value that is of the target energy storage battery and that is monitored by the battery management system 2002 reaches the target SoC value. If the discharge current is obtained, the discharge current is input to the equivalent model of the target energy storage battery, and the target energy storage battery is controlled to be discharged, so that the SoC value that is of the target energy storage battery and that is monitored by the battery management system 2002 reaches the target SoC value.

In Manner 2, the feedforward model does not need to be designed for the power conversion system 2003, and the power conversion system 2003 may determine the first specified active power value 2 of the target energy storage battery based on only the difference between the SoC value of the target energy storage battery and the target SoC value. In this way, closed-loop adjustment can be implemented for the SoC value of the target energy storage battery, thereby effectively preventing the energy storage battery from being fully charged or discharged.

In the embodiment shown in FIG. 4, when the power conversion system 2003 determines that the SoC value of the target energy storage battery does not meet the target SoC value and determines that the present frequency of the power grid 201 connected to the power conversion system 2003 falls within the frequency modulation constant band, the power conversion system 2003 may control the target energy storage battery to be charged or discharged, to implement closed-loop adjustment of the SoC value. In this way, the energy storage battery can be effectively prevented from being excessively fully charged or discharged, so that the energy storage system can continuously participate in a frequency modulation service. Therefore, a time period in which the energy storage system participates in the primary frequency modulation service is effectively prolonged, thereby improving a yield of the frequency modulation service.

Figure 7:
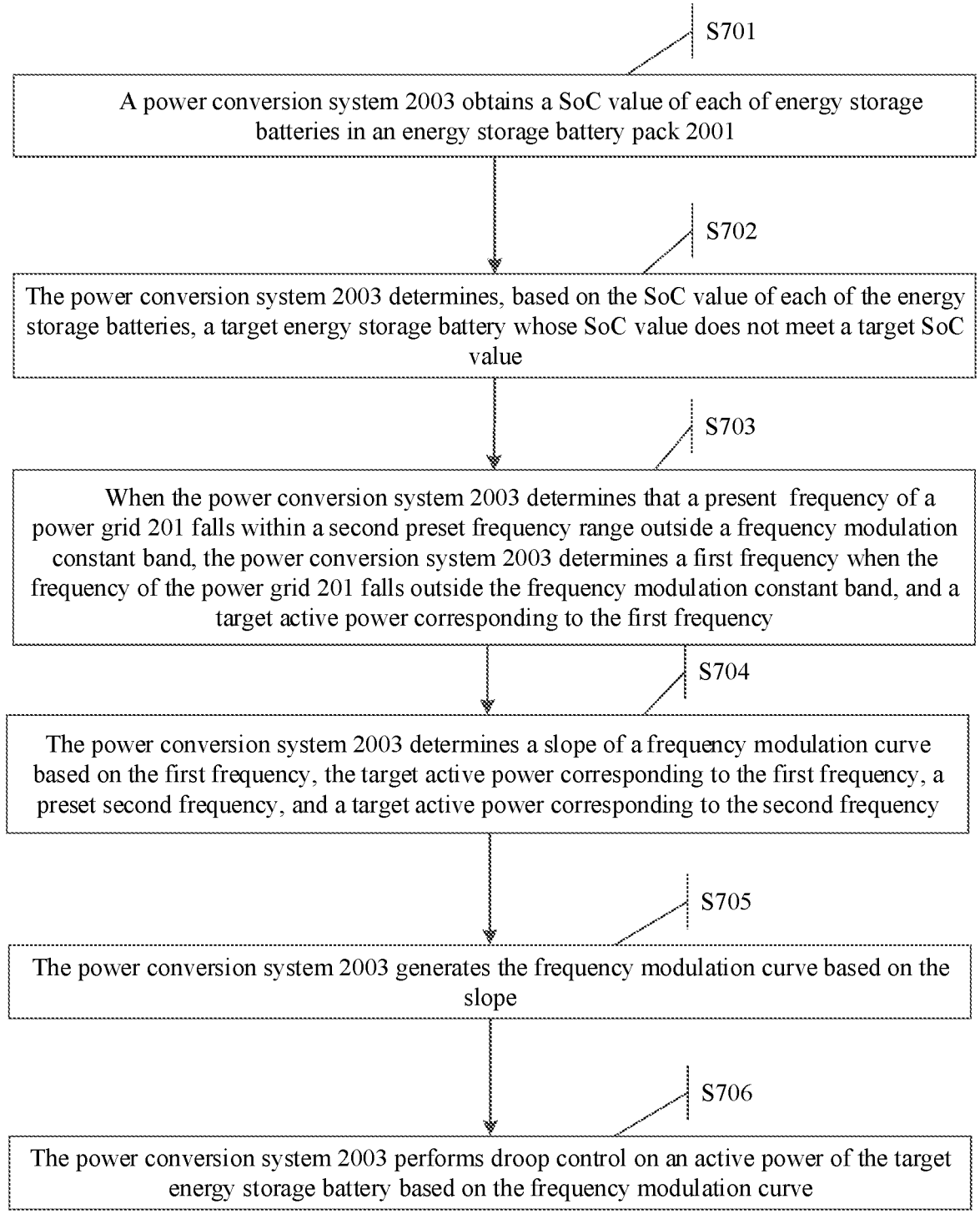
FIG. 7 is a schematic flowchart of another method for optimizing primary frequency modulation according to an embodiment of this application.

FIG. 7 is a schematic flowchart of another method for optimizing primary frequency modulation according to an embodiment of this application. This method is applicable to Scenario 2. The method includes the following steps.

S701: The power conversion system 2003 obtains the SoC value of each of the energy storage batteries in the energy storage battery pack 2001.

S702: The power conversion system 2003 determines, based on the SoC value of each of the energy storage batteries, that the SoC value of the target energy storage battery does not meet the target SoC value.

It should be understood that description of steps S701 and S702 is the same as the description of step S401 and S402. Refer to the foregoing description. Details are not described herein again.

S703: When the power conversion system 2003 determines that the present frequency of the power grid 201 falls within a second preset frequency range outside the frequency modulation constant band, the power conversion system 2003 determines a first frequency when the frequency of the power grid 201 falls outside the frequency modulation constant band, and a target active power corresponding to the first frequency.

It should be understood that the second preset frequency range may be specifically the floating band described above.

In a possible implementation, the power conversion system 2003 may collect a voltage of the power grid 201, calculate the present frequency of the power grid 201 based on the voltage, and compare the present frequency of the power grid 201 with a frequency range corresponding to the frequency modulation constant band, to determine whether the present frequency of the power grid 201 falls outside the frequency modulation constant band.

S704: The power conversion system 2003 determines a slope of a frequency modulation curve based on the first frequency, the active power corresponding to the first frequency, a preset second frequency, and an active power corresponding to the second frequency.

Figure 8:
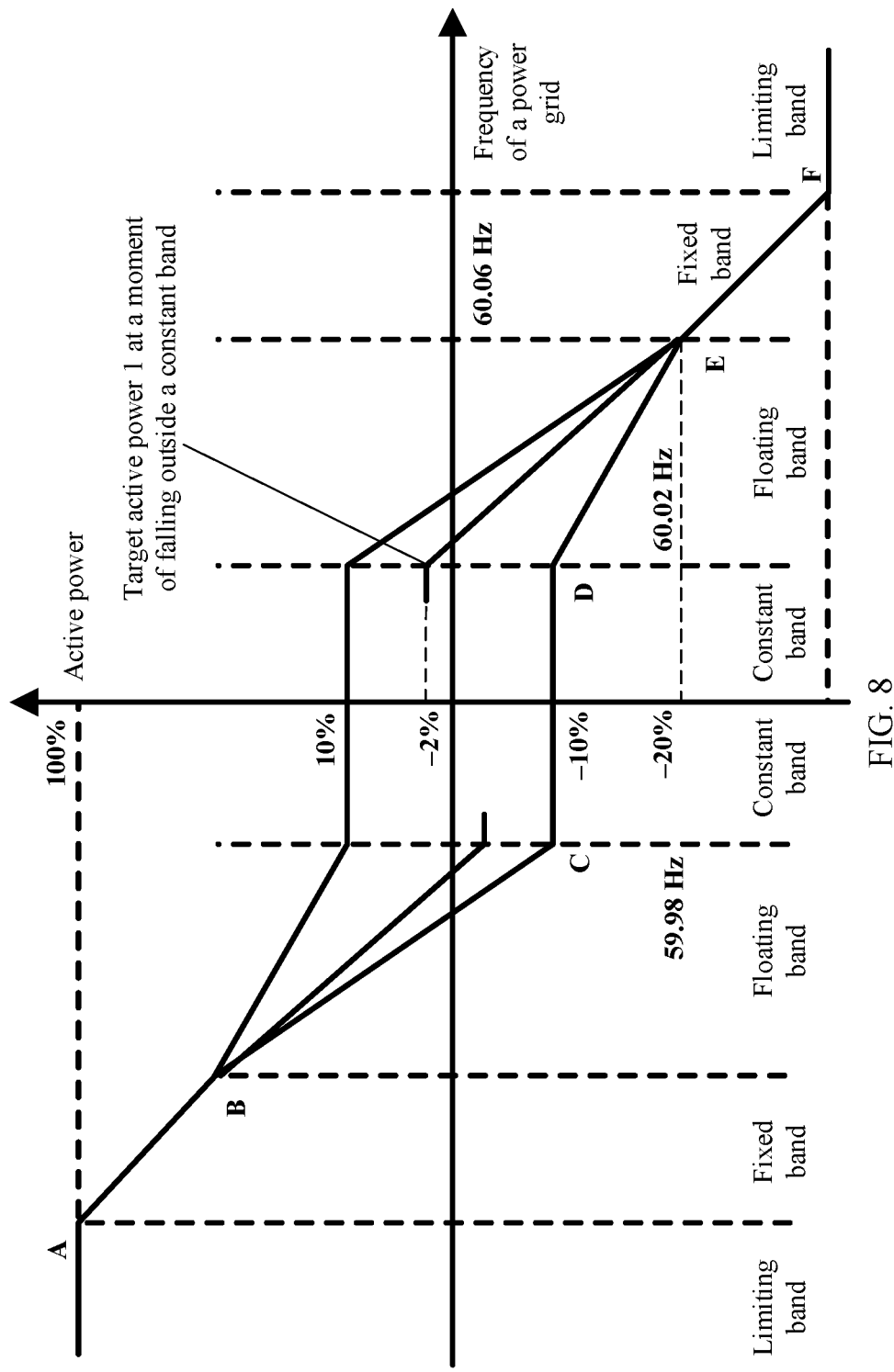
FIG. 8 is a schematic flowchart of determining a slope of a frequency modulation curve according to an embodiment of this application.

It should be understood that the second frequency is a preset frequency, for example, a start frequency of a fixed band (that is, a frequency corresponding to a point E in FIG. 8), or a cut-off frequency of a fixed band (that is, a frequency corresponding to a point B in FIG. 8); and the target active power corresponding to the second frequency is a preset target active power corresponding to the start frequency of the fixed band (that is, a target active power corresponding to the point E in FIG. 8), or a target active power corresponding to the cut-off frequency of the fixed band (that is, a target active power corresponding to a point B in FIG. 8).

S705: The power conversion system 2003 generates the frequency modulation curve based on the slope.

For example, still with reference to FIG. 8, if a rated frequency range of the frequency modulation constant band is 59.98 Hz to 60.02 Hz, the first frequency at which the frequency of the power grid 201 falls outside the frequency modulation constant band is 60.02 Hz, the target active power 1 corresponding to the first frequency is 2%, the preset second frequency is 60.06 Hz, and the target active power corresponding to the second frequency is −20%. The power conversion system 2003 may obtain the slope of the frequency modulation curve through calculation: 5.5, and further obtain the frequency modulation curve y=−5.5x+330.13. Herein, y indicates the active power, and x indicates the frequency of the power grid.

S706: The power conversion system 2003 performs droop control on the active power of the target energy storage battery based on the frequency modulation curve.

In a possible implementation, after the power conversion system 2003 performs droop control on the active power of the target energy storage battery based on the frequency modulation curve, the power conversion system 2003 may further obtain the present frequency of the power grid 201. The power conversion system 2003 may further determine the second specified active power value based on the frequency modulation curve and the present frequency of the power grid 201, and control, based on the second specified active power value, the target energy storage battery to be charged or discharged, to stabilize the frequency of the power grid 201. In this way, frequency modulation is flexibly and effectively performed on the power grid 201.

It should be noted that there are the following two cases in which the SoC value of the target energy storage battery in step S702 does not meet the target SoC value. The following separately describes different cases.

In Case 1, the SoC value of the target energy storage battery is greater than the target SoC value, that is, the target energy storage battery has a relatively high battery level and is prone to an overcharged state. Therefore, the power conversion system 2003 controls, based on a third specified active power value, the target energy storage battery to be discharged, so that the SoC value that is of the target energy storage battery and that is monitored by the battery management system 2002 reaches the target SoC value.

In Case 2, the SoC value of the target energy storage battery is less than the target SoC value, that is, the target energy storage battery has a relatively low battery level and is prone to a completely discharged state. Therefore, the power conversion system 2003 can control, based on a third specified active power value, the target energy storage battery to be charged, so that the SoC value that is of the target energy storage battery and that is monitored by the battery management system 2002 reaches the target SoC value.

In the embodiment shown in FIG. 7, the power conversion system may dynamically reconstruct the frequency modulation curve based on the frequency when the frequency of the power grid 201 falls outside the frequency modulation constant band and the target active power corresponding to the frequency, so that the active power can change smoothly. In this way, impact on the power grid is effectively reduced, and friendliness to the power grid 201 is enhanced.

The foregoing embodiments may be used in combinations, or may be used separately. This is not specifically limited in the embodiments of this application.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may be alternatively loaded onto a computer or another programmable data processing device, so that a series of operations and steps are performed on the computer or the another programmable device to generate computer-implemented processing. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to this application without departing from the scope of this application. In this way, this application is intended to cover these modifications and variations of this application provided that they fall within the protection scope defined by the following claims and their equivalent technologies.

What is claimed is:

1. An energy storage system, comprising:
a plurality of energy storage batteries, wherein each of the plurality of energy storage batteries is configured to store or release electric energy;
a battery management system separately connected to a power conversion system and each of the plurality of energy storage batteries, and the battery management system is configured to monitor a state of charge (SoC) value, a voltage value, and a current value of each of the plurality of energy storage batteries; and
the power conversion system, wherein the power conversion system is separately connected to each of the plurality of energy storage batteries and a power grid, and the power conversion system is configured to:
obtain the SoC value of each of the plurality of energy storage batteries; and
determine, based on the SoC value of each of the plurality of energy storage batteries, that a target energy storage battery does not meet a target SoC value; and
when a present frequency of the power grid falls within a frequency modulation constant band, control, based on a preset mapping relationship between a SoC value and an active power, the target energy storage battery to be charged or discharged, wherein in the preset mapping relationship, a lower limit value of the SoC value corresponds to a lower limit value of the active power in the frequency modulation constant band, and an upper limit value of the SoC value corresponds to an upper limit value of the active power in the frequency modulation constant band, wherein the SoC value that is of the target energy storage battery and that is monitored by the battery management system reaches the target SoC value, and wherein the frequency modulation constant band is a first preset frequency range of the power grid.

2. The energy storage system according to claim 1, wherein in the preset mapping relationship, an active power corresponding to the target SoC value is zero, the lower limit value of the active power is a minimum value of a charge power, and the upper limit value of the active power is a maximum value of a discharge power.

3. The energy storage system according to claim 1, wherein when the power conversion system controls, based on the preset mapping relationship between a SoC value and an active power, the target energy storage battery to be charged or discharged, the power conversion system is configured to:
determine a first specified active power value based on the preset mapping relationship; and
control, based on the first specified active power value, the target energy storage battery to be charged or discharged, wherein the SoC value that is of the target energy storage battery and that is monitored by the battery management system reaches the target SoC value.

4. The energy storage system according to claim 3, wherein when the power conversion system determines the first specified active power value corresponding to the SoC value of the target energy storage battery, the power conversion system is configured to:
obtain the first specified active power value based on a feedforward power of the target energy storage battery and a difference between the SoC value of the target energy storage battery and the target SoC value, wherein the feedforward power is determined based on a feedforward model of the SoC value of the target energy storage battery, the feedforward model is determined based on the preset mapping relationship, input of the feedforward model is the SoC value of the target energy storage battery, and output of the feedforward model is the feedforward power of the SoC value of the target energy storage battery; or
obtain the first specified active power value based on the difference between the SoC value of the target energy storage battery and the target SoC value.

5. The energy storage system according to claim 3, wherein when the power conversion system is configured to control, based on the first specified active power value, the target energy storage battery to be charged or discharged, the power conversion system is configured to:
input the first specified active power value to a power closed-loop transfer function to obtain a first specified current value; and
input the first specified current value to a current closed-loop transfer function to obtain a charge current, and input the charge current to an equivalent model of the target energy storage battery to control the target energy storage battery to be charged, wherein the SoC value that is of the target energy storage battery and that is monitored by the battery management system reaches the target SoC value; or
input the first specified current value to a current closed-loop transfer function to obtain a discharge current, and input the discharge current to an equivalent model to control the target energy storage battery to be discharged, wherein the SoC value that is of the target energy storage battery and that is monitored by the battery management system reaches the target SoC value, wherein
input of the equivalent model is the charge current or the discharge current of the target energy storage battery, and output of the equivalent model is the SoC value of the target energy storage battery.

6. The energy storage system according to claim 1, wherein the power conversion system is further configured to:
when the present frequency of the power grid falls within a second preset frequency range beyond the frequency modulation constant band,
determine a frequency modulation curve based on a first frequency when the present frequency of the power grid falls outside the frequency modulation constant band, a target active power corresponding to the first frequency, a preset second frequency, and a target active power corresponding to the preset second frequency; and
perform droop control on the active power of the target energy storage battery based on the frequency modulation curve.

7. The energy storage system according to claim 6, wherein the power conversion system is further configured to:
after performing droop control on the active power of the target energy storage battery based on the frequency modulation curve, obtain the present frequency of the power grid;

determine, based on the frequency modulation curve, a second specified active power value corresponding to the present frequency of the power grid; and control, based on the second specified active power value, the target energy storage battery to be charged or discharged, to stabilize the present frequency of the power grid.

8. The energy storage system according to claim 1, wherein the power conversion system is configured to receive the SoC value of each of the plurality of energy storage batteries from the battery management system.

9. The energy storage system according to claim 8, wherein the power conversion system is configured to calculate the SoC value of each of the plurality of energy storage batteries based on the voltage value and the current value.

10. The energy storage system according to claim 3, wherein the power conversion system is configured to:

obtain the first specified active power value based on a feedforward power of the target energy storage battery and a difference between the SoC value of the target energy storage battery and the target SoC value, wherein the feedforward power is determined based on a feedforward model of the SoC value of the target energy storage battery, the feedforward model is determined based on the preset mapping relationship, input of the feedforward model is the SoC value of the target energy storage battery, and output of the feedforward model is the feedforward power of the SoC value of the target energy storage battery.

11. A power conversion system, separately connected to a battery management system, a power grid, and a plurality of energy storage batteries in a power conversion system, wherein the power conversion system is configured to:

obtain a state of charge (SoC) value of each of the plurality of energy storage batteries;

determine a target energy storage battery based on the SoC value of each of the energy storage batteries, wherein the SoC value of the target energy storage battery does not meet a target SoC value, the SoC value of each of the energy storage batteries is sent by the battery management system to the power conversion system; and when a present frequency of the power grid falls within a frequency modulation constant band, control, based on a preset mapping relationship between a SoC value and an active power, the target energy storage battery to be charged or discharged, wherein in the preset mapping relationship, a lower limit value of the SoC value corresponds to a lower limit value of the active power in the frequency modulation constant band, and an upper limit value of the SoC value corresponds to an upper limit value of the active power in the frequency modulation constant band, wherein the SoC value that is of the target energy storage battery and that is monitored by the battery management system reaches the target SoC value, and wherein the frequency modulation constant band is a first preset frequency range of the power grid.

12. A method for optimizing primary frequency modulation of an energy storage system, wherein:

the energy storage system comprises a battery management system, a power conversion system, and a plurality of energy storage batteries, the battery management system is separately connected to the power conversion system and each of the plurality of energy storage batteries, and the power conversion system is separately connected to each of the plurality of energy storage batteries and a power grid; and the method comprises:

obtaining, by the power conversion system, a state of charge (SoC) value of each of the energy storage batteries;

determining a target energy storage battery based on the SoC value of each of the plurality of energy storage batteries, wherein a SoC value of the target energy storage battery does not meet a target SoC value; and when a present frequency of the power grid falls within a frequency modulation constant band, controlling, by the power conversion system based on a preset mapping relationship between a SoC value and an active power, the target energy storage battery to be charged or discharged, wherein in the preset mapping relationship, a lower limit value of the SoC value corresponds to a lower limit value of the active power in the frequency modulation constant band, and an upper limit value of the SoC value corresponds to an upper limit value of the active power in the frequency modulation constant band, wherein the SoC value that is of the target energy storage battery and that is monitored by the battery management system reaches the target SoC value, and wherein the frequency modulation constant band is a first preset frequency range of the power grid.

13. The method according to claim 12, wherein in the preset mapping relationship, an active power corresponding to the target SoC value is zero, the lower limit value of the active power is a minimum value of a charge power, and the upper limit value of the active power is a maximum value of a discharge power.

14. The method according to claim 12, wherein the controlling, based on a preset mapping relationship between a SoC value and an active power, the target energy storage battery to be charged or discharged comprises:

determining a first specified active power value based on the preset mapping relationship; and controlling, based on the first specified active power value, the target energy storage battery to be charged or discharged, wherein the SoC value that is of the target energy storage battery and that is monitored by the battery management system reaches the target SoC value.

15. The method according to claim 14, wherein that the power conversion system determines the first specified active power value corresponding to the SoC value of the target energy storage battery comprises:

obtaining, by the power conversion system, the first specified active power value based on a feedforward power of the target energy storage battery and a difference between the SoC value of the target energy storage battery and the target SoC value, wherein the feedforward power is determined based on a feedforward model of the SoC value of the target energy storage battery, the feedforward model is determined based on the preset mapping relationship, input of the feedforward model is the SoC value of the target energy storage battery, and output of the feedforward model is the feedforward power of the SoC value of the target energy storage battery; or obtaining, by the power conversion system, the first specified active power value based on the difference between the SoC value of the target energy storage battery and the target SoC value.

16. The method according to claim 14, wherein the controlling, by the power conversion system based on the first specified active power value, the target energy storage battery to be charged or discharged comprises:
- inputting, by the power conversion system, the first specified active power value to a power closed-loop transfer function to obtain a first specified current value; and
- inputting, by the power conversion system, the first specified current value to a current closed-loop transfer function to obtain a charge current, and inputting the charge current to an equivalent model of the target energy storage battery to control the target energy storage battery to be charged, wherein the SoC value that is of the target energy storage battery and that is monitored by the battery management system reaches the target SoC value; or
- inputting, by the power conversion system, the first specified current value to a current closed-loop transfer function to obtain a discharge current, and inputting the discharge current to the equivalent model to control the target energy storage battery to be discharged, wherein the SoC value that is of the target energy storage battery and that is monitored by the battery management system reaches the target SoC value, wherein
- input of the equivalent model is the charge current or the discharge current of the target energy storage battery, and output of the equivalent model is the SoC value of the target energy storage battery.

17. The method according to claim 12, wherein the method further comprises:
- when the present frequency of the power grid falls within a second preset frequency range beyond the frequency modulation constant band,
  - determining, by the power conversion system, a frequency modulation curve based on a first frequency when the present frequency of the power grid falls outside the frequency modulation constant band, a target active power corresponding to the first frequency, a preset second frequency, and a target active power corresponding to the preset second frequency; and
- performing droop control on the active power of the target energy storage battery based on the frequency modulation curve.

18. The method according to claim 17, wherein after the performing, by the power conversion system, droop control on the active power of the target energy storage battery based on the frequency modulation curve, the method further comprises:
- obtaining, by the power conversion system, the present frequency of the power grid;
- determining, by the power conversion system based on the frequency modulation curve, a second specified active power value corresponding to the present frequency of the power grid; and
- controlling, based on the second specified active power value, the target energy storage battery to be charged or discharged, to stabilize the present frequency of the power grid.

19. The method according to claim 12, wherein the power conversion system receives the SoC value of each of the plurality of energy storage batteries from the battery management system.

20. The method according to claim 18, wherein the power conversion system calculates the SoC value of each of the plurality of energy storage batteries based on a voltage value and a current value of each of the plurality of energy storage batteries.

* * * * *